United States Patent
Neves Correia de Pinto et al.

(10) Patent No.: US 8,945,645 B2
(45) Date of Patent: Feb. 3, 2015

(54) METHOD FOR SIMULTANEOUS CONCENTRATION AND RECTIFICATION OF GRAPE MUST USING NANOFILTRATION AND ELECTRODIALYSIS

(75) Inventors: Maria Norberta Neves Correia de Pinto, Lisbon (PT); Victor Manuel Geraldes Fernandes, Lisbon (PT); Isabel Margarida Martins Lopes Catarino Gomes, Sao Domingos de Rana (PT)

(73) Assignee: Instituto Superior Tecnico, Lisbon (PT)

(*) Notice: Subject to any disclaimer, the term of this patent is extended or adjusted under 35 U.S.C. 154(b) by 1147 days.

(21) Appl. No.: 12/446,668

(22) PCT Filed: Oct. 22, 2007

(86) PCT No.: PCT/PT2007/000045
§ 371 (c)(1),
(2), (4) Date: Dec. 18, 2009

(87) PCT Pub. No.: WO2008/051100
PCT Pub. Date: May 2, 2008

(65) Prior Publication Data
US 2010/0092628 A1    Apr. 15, 2010

(30) Foreign Application Priority Data

Oct. 24, 2006 (PT) .......................... 103595

(51) Int. Cl.
A23C 9/14      (2006.01)
C12G 1/02      (2006.01)
A23L 2/08      (2006.01)
A23L 2/74      (2006.01)

(52) U.S. Cl.
CPC . *C12G 1/02* (2013.01); *A23L 2/085* (2013.01); *A23L 2/087* (2013.01); *A23L 2/74* (2013.01)
USPC ........ 426/239; 426/489; 426/490; 426/330.5; 426/590; 426/495

(58) Field of Classification Search
USPC .............. 426/489, 490, 330.5, 599, 590, 239, 426/495
See application file for complete search history.

(56) References Cited

U.S. PATENT DOCUMENTS

| | | | | |
|---|---|---|---|---|
| 4,643,902 | A * | 2/1987 | Lawhon et al. | 426/271 |
| 6,054,168 | A * | 4/2000 | Lioutas et al. | 426/599 |
| 6,440,222 | B1 * | 8/2002 | Donovan et al. | 127/55 |
| 2003/0198694 | A1 * | 10/2003 | Chou | 424/725 |
| 2004/0234658 | A1 * | 11/2004 | Bonnet et al. | 426/489 |

OTHER PUBLICATIONS

A preliminary comparision between nanofilitration and reverse osmosis membranes for grape juice treatment NPL, Roberto Ferrarini, Journal of Food Engineering vol. 50, Issue 2, Nov. 2001, pp. 113-116 , http://www.sciencedirect.com/science/article/pii/S0260877400001990.*

* cited by examiner

*Primary Examiner* — Drew Becker
*Assistant Examiner* — Preston Smith
(74) *Attorney, Agent, or Firm* — Sughrue Mion, PLLC

(57) ABSTRACT

The invention described herein relates to a process for the simultaneous concentration and rectification of grape must with the retention of the volatile aromas precursors. The process consists in the integration of nanofiltration in concentration/diafiltration modes, with electrodialysis. The nanofiltration membranes exhibit selective permeation controlled by steric hindrance mechanisms and/or electrostatic interactions.

24 Claims, No Drawings

METHOD FOR SIMULTANEOUS CONCENTRATION AND RECTIFICATION OF GRAPE MUST USING NANOFILTRATION AND ELECTRODIALYSIS

BACKGROUND OF THE INVENTION

Concentrated grape must is a product with several applications both for the wine and food industry. In wine production, concentrated grape must is added to the raw grape must whenever the natural concentration of sugars is insufficient to produce high-quality wines, due to the insufficient maturation of the grapes in the vineyard. The insufficient maturation is usually the result of adverse climate conditions, especially when high rainfall occurs during the vintage, but it can be also the result of the anticipation of the vintage. This last practice is commonly performed to avoid the risk of deterioration of the grapes due to the occurrence of rainfall.

Depending on the type of wine produced, grape must concentrate with different specifications of composition can be mixed with raw grape must to increase the final alcohol concentration. Rectified concentrated grape must, which is the outcome of the concentration of the grape must that has been deionised and decolorized, can be used to increase the sugar concentration, and hence, the alcohol potential, of the raw grape must without changing the organoleptic properties of the wine. For this reason, rectified concentrated grape must, which is a mix of the natural grape sugars with a concentration between 65 and 70° Brix, can be used in the production of every type of wine.

For the some European countries where chaptalization is forbidden, the addition of concentrated grape must is the only available method allowed to increase the alcohol potential of raw grape musts. Even for the countries where chaptalization is allowed, there are strong recommendations from the European Commission to replace the saccharose by concentrated grape must. On another side, in officially demarcated regions, the use of concentrated must from grapes of these regions may contribute to maintain the specific organoleptic properties of the wine.

In the food industry, the concentrated grape must is a premium natural sweeter rich in glucose and fructose that can be used instead of saccharose for the formulation of food products that are seen as more natural and healthier by the final consumer.

The conventional process for concentration of grape must is based on vacuum evaporators. In addition, for the production of rectified concentrated grape must, this process is preceded by a complex sequence of ion exchange resins that remove almost completely organic acids, polyphenols and delicate compounds such as aromas precursors. The evaporation process can increase the total solids concentration of grape must until about 70° Brix, but does not preserve the aromatic precursors of the wine and other delicate constituents, which are degraded thermally or by oxidation. Furthermore, due to the change of phase of the evaporated water, the evaporation is an energy intensive process. Additionally, for the production of rectified concentrated grape must, the sequence of ion exchange resins is complex, expensive and generates high volumes of liquid effluents and solid wastes.

Different types of processes have been proposed to produce concentrated grape must or rectified concentrated grape must. The concentrated grape must is usually produced by using vacuum evaporators [1,2]. In the case of the rectified concentrated grape must, the organic acids, ions and aromas are additionally removed in a complex sequence of ion exchange resins [3,4]. The main disadvantages of the evaporation process are: the irreversible modification of the grape must composition due to the increase of the temperature, the loss of volatile fragrances and the high energy consumption due to the change of phase of the removed water. In the case of production of rectified concentrated grape must, there is not only the loss of organoleptic properties of the grape must, but also the environmental problem of discharge of high volumes of effluents produced during the regeneration of the ion exchange resins.

The reverse osmosis (RO) has been proposed to produce concentrated grape must to be used for wine production [5], using RO membranes with a sodium chloride rejection coefficient higher than 97.5% in plate-and-frame modules. More recent studies [6,7] have shown, however, that the productivity of RO can be very low due to the membrane fouling, caused by the precipitation of potassium bitartrate.

The nanofiltration, as a unit operation controlled by steric hindrance mechanisms associated simply to the molecular weight cut-off limit of the membrane, has been investigated in its basic capacity of concentrating grape must, in alternative to the reverse osmosis and with the advantage of operating at lower transmembrane pressures [7-9]. In the present invention, the nanofiltration is primarily controlled by mechanisms of electrostatic interactions that make possible the preferential transport of ionic species and the fractionation of mixtures of neutral solutes (sugars) and organic acids that enable the simultaneous concentration and partial rectification of the grape must in a single operation.

SUMMARY OF THE INVENTION

The method described herein uses nanofiltration to simultaneously concentrate and rectify partially grape must. Nanofiltration has the capacity to fractionate the grape must through the selective permeation of ionic species. This is in contrast with the reverse osmosis, which separates only pure water from the grape must. The invention described herein enables the fractionation of the grape must with recourse to three key-factors: 1) selection of the nanofiltration membrane type, 2) control of the nanofiltration operation mode and 3) hybridization of the nanofiltration with electrodialysis.

The selection of the membrane type, in terms of material and morphology, combined with the physico-chemical composition of the concentrates, which is determined by the operation mode during the concentration step, allows the fractionation of sugars/organic acids of the grape must, due to the preferential permeation of the organic acids. It is possible in this way to obtain concentrated grape musts with different levels of organic acids. In the present invention, the nanofiltration is predominantly controlled by the interactions solute(s)/water in the concentrated solution and by the interactions membrane/solute(s).

The nanofiltration operated in diafiltration mode enables the additional reduction of the concentration of organic acids in the concentrated grape musts. The water used for diafiltration is obtained by reverse osmosis of the nanofiltration permeates, to ensure that all the water used in the process comes from the raw grape must.

The electrodialysis of the grape must, before the concentration step by nanofiltration, can remove between 10% and 40% of the grape must ions. After the concentration step by nanofiltration, the electrodialysis is adequate to make a fine control of the concentration of organic acids in the final grape must concentrate. The electrodialysis of the grape must before the nanofiltration is recommended whenever the potassium bitartrate concentration is too high, in order to avoid the fouling of the nanofiltration membranes due to the precipitation of this substance.

DETAILED DESCRIPTION OF THE INVENTION

The present invention is a process for the concentration and partial rectification of the grape must, based on the use of nanofiltration membranes that reject the grape must sugars and preferentially permeate the organic acids, being this preferential permeation controlled by the concentration factor (defined as the ratio of the initial to the final volume of grape must in the concentration process). The grape must, previously clarified and at room temperature, is processed by nanofiltration, using compact membrane modules wherein the grape must flows tangentially to the membrane surface, in order to concentrate the compounds that are retained by the membranes. Increasing the transmembrane pressure above the osmotic pressure of the grape must, the water and organic acids permeate preferentially through the membrane, while the sugars and aromatic precursors of the wine are concentrated.

The nanofiltration membranes required for this invention must have both a cut-off between 150 and 300 Dalton and an active layer electrically charged. Furthermore, the selective permeation characteristics of the nanofiltration membranes must be controlled also both by steric hindrance and electrostatic interactions between the solutes and the membrane material. The nanofiltration membranes allow rejection coefficients for sugars higher than 95% and lower than 40% for organic acids (mainly malic and tartaric acids). These membranes have rejection coefficients to the organic acids that decrease with increasing concentration factors. For this reason, it is possible to control the degree of rectification through the specification of the final concentration factor of the grape must.

To reduce further the concentration of organic acids of the concentrate grape must, the nanofiltration is operated in diafiltration mode. In this case, the grape must is first concentrated until a given optimal value of the concentration factor, and then the nanofiltration proceeds with the addition of water until the pretended concentration of organic acids is obtained. The water used in the diafiltration is obtained by reverse osmosis of the nanofiltration permeates. In this way, all the water used in the process comes from the original grape must.

Another method proposed in this invention to regulate the final organic acids concentration of the concentrated grape must consists in the grape must deionization by electrodialysis. In this hybrid process, the electrodialysis of the grape must can be performed before the nanofiltration, after the nanofiltration or both before and after the nanofiltration. The electrodialysis of the grape must before the nanofiltration is recommended for processing grape musts with high concentration of potassium bitartrate, to reduce the grape must conductivity between 10% and 40% of its initial value. In this way, as the potassium bitartrate concentration is reduced, the risk of subsequent nanofiltration membrane fouling, due to the precipitation of this salt, is also reduced. If the initial concentration of potassium bitartrate in the grape must is low, it is more advantageous to perform the electrodialysis only after the concentration of the grape must by nanofiltration.

The processes of the invention for grape must concentration and rectification, i.e. nanofiltration, nanofiltration/diafiltration and nanofiltration/electrodialysis can either operate in continuous, semi-continuous or batch modes.

Thus, it is an object of the invention a method for simultaneous concentration and rectification of grape must, wherein nanofiltration and electrodialysis are combined in a hybrid process.

In said method, the nanofiltration membranes fractionates the grape must through the selective permeation of ionic species.

Preferably, the nanofiltration membranes have a cut-off in the range between 150 and 300 Dalton and a selective permeation of organic acids that is controlled by steric hindrance mechanisms and electrostatic interactions between the solutes and the membrane.

In a preferred method, the grape must nanofiltration in total recirculation mode has rejection coefficients to the sugars higher than 95% and to the organic acids lower than 40%.

The above nanofiltration concentration process configures parametrically the rate of fractionation sugars/organic acids, being the fraction of the retentate rich in sugars and the one of the permeate rich in acids.

In the above method, the nanofiltration permeate stream is processed by reverse osmosis for organic acids removal.

The nanofiltration concentrates are, normally, purified by diafiltration, using the reverse osmosis permeates.

The grape must is rectified by electrodialysis with partial deionisation in the range between 10% and 40%.

The nanofiltration concentrates are processed by electrodialysis for partial deionization.

In the method of the invention, the process do not require thermal separation and is also capable of operating at room temperature or at temperatures that ensure the conservation of volatile compounds and aromas precursors.

The process can be used for concentration and rectification of pulps and juices of fruits.

EXAMPLES

Example 1

A volume of 5.5 L of grape must, with a total sugars concentration of 123 g $L^{-1}$ and 2.8 g $L^{-1}$ of lactic acid was processed by nanofiltration, using a polyamide composite membrane with a cut-off of 260 Dalton and a permeation area of 0.102 $m^2$, in a plate-and-frame module. The grape must, pressurized at 40 bar and at 25° C., circulated tangentially to the membrane, in batch concentration mode until the concentration factor reached a value of 1.4. The concentrate grape must, at this concentration factor, had a total sugars concentration of 165 g $L^{-1}$ and a lactic acid concentration of 3.1 g $L^{-1}$. The final permeate flux was 13.4 L $m^{-2}$ $h^{-1}$, while the permeate stream had a total sugars concentration of 3.1 g $L^{-1}$ and a lactic acid concentration of 2.5 g $L^{-1}$. The observed rejection coefficients at a concentration factor of 1.4 were, therefore, 98% for the sugars and 18% for the lactic acid.

Example 2

A volume of 5.5 L of grape must, with a total sugars concentration of 123 g $L^{-1}$ and 5.2 g $L^{-1}$ of malic acid was processed by nanofiltration, using a polyamide composite membrane with a cut-off of 260 Dalton and a permeation area of 0.102 $m^2$, in a plate-and-frame module. The grape must, pressurized at 50 bar and at 25° C., circulated tangentially to the membrane, in batch concentration mode until the concentration factor reached a value of 2.2. The concentrate grape must, at this concentration factor, had a total sugars concentration of 232 g $L^{-1}$ and a malic acid concentration of 7.23 g $L^{-1}$. The final permeate flux was 2.3 L $m^{-2}$ $h^{-1}$, while the permeate stream had a total sugars concentration of 13.8 g L$^{-1}$ and a malic acid concentration of 5.4 g L$^{-1}$. The observed rejection coefficients at a concentration factor of 2.2 were, therefore, 95% for the sugars and 27% for the malic acid.

REFERENCES

[1] Dimitriu, M. H. "Method of concentrating grape juice" 1986, U.S. Pat. No. 4,597,978
[2] Thumm, H. "Grape juice concentrate and drink" 1990, U.S. Pat. No. 4,976,974
[3] Chu, O. A., Chung, Y. and Pepper, M. A. "JUICE PROCESSING INCORPORATING RESIN TREATMENT", 2006, U.S. Pat. No. 7,108,887
[4] Johnson, R. L. and Chandler, B. V. "Ion Exchange and Absorbent Resins for Removal of Acids and Bitter Principles from Citrus Juices", J. Sci. Food Agric. 1985, 36, 480-484.
[5] Madsen, R. F. "Method of concentrating grape juice for using in the production of wines" Patent no. 1454 792, London Patent Office.
[6] Mietton-Peuchot, M., Milisic, V. and Noilet, P. "Grape must concentration by using reverse osmosis: Comparison with chaptalization" Desalination 148 (2002) 125-129.
[7] Ferrarini, R., Versari, A. and Galassi, S. "A preliminary comparison between nanofiltration and reverse osmosis membranes for grape juice treatment" Journal of Food Engineering 50 (2001) 113-116.
[8] Versari, A., Ferrarini, R., Parpinello, G. P. and Galassi, S. "Concentration of grape must by nanofiltration membranes" FOOD AND BIOPRODUCTS PROCESSING 81 (C3): 275-278 SEP 2003.
[9] Kiss, I., Vatai, G. Y. and Bekassy-Molnar, E. "Must concentrate using membrane technology" Desalination 162 (2004) 295-300.

The invention claimed is:

1. A method for the simultaneous concentration and rectification of grape must comprising:
   subjecting grape must to nanofiltration using nanofiltration membranes in a single operation in order to achieve simultaneous concentration and, at least partial, rectification of grape must,
   controlling degree of rectification, which consists of the passage of the organic acids to the permeate, of the must by controlling concentration factor;
   wherein grape must sugars are retained in a retentate stream and are partially separated from organic acids that permeate to the permeate stream, and
   wherein the nanofiltration membranes have values of cut-off ranging from 150 to 300 Dalton and an active layer electrically charged.

2. The method according to claim 1 wherein the grape must nanofiltration in total recirculation mode has rejection coefficients to the sugars higher than 95% and to the organic acids lower than 40%.

3. The method according to claim 1 wherein nanofiltration is controlled by a concentration factor to yield a fractionation of the grape must into a retentate fraction rich in sugars and a permeate fraction rich in organic acids.

4. The method according to claim 1, wherein the nanofiltration grape must concentrates obtained at the optimal value of concentration factor are further processed by nanofiltration in diafiltration mode to reduce the content of the organic acids in the concentrates.

5. The method according to claim 1, wherein the nanofiltration grape must concentrates obtained at the optimal value of concentration factor are further processed by electrodialysis to make a fine control of the concentration of organic acids in the final grape must concentrate.

6. The method according to claim 2 wherein nanofiltration is controlled by a concentration factor to yield a fractionation of the grape must into a retentate fraction rich in sugars and a permeate fraction rich in organic acids.

7. The method according to claim 2 wherein a degree of rectification, which consists of a passage of the organic acids to the permeate, is controlled by the concentration factor.

8. The method according to claim 3 wherein a degree of rectification, which consists of a passage of the organic acids to the permeate, is controlled by the concentration factor.

9. The method according to claim 6 wherein a degree of rectification, which consists of the passage of the organic acids to the permeate, is controlled by the concentration factor.

10. The method according to claim 2, wherein the nanofiltration grape must concentrates obtained at the optimal value of concentration factor are further processed by nanofiltration in diafiltration mode to reduce the content of the organic acids in the concentrates.

11. The method according to claim 3, wherein the nanofiltration grape must concentrates obtained at the optimal value of concentration factor are further processed by nanofiltration in diafiltration mode to reduce the content of the organic acids in the concentrates.

12. The method according to claim 1, wherein the nanofiltration grape must concentrates obtained at the optimal value of concentration factor are further processed by nanofiltration in diafiltration mode to reduce the content of the organic acids in the concentrates.

13. The method according to claim 6, wherein the nanofiltration grape must concentrates obtained at the optimal value of concentration factor are further processed by nanofiltration in diafiltration mode to reduce the content of the organic acids in the concentrates.

14. The method according to claim 7, wherein the nanofiltration grape must concentrates obtained at the optimal value of concentration factor are further processed by nanofiltration in diafiltration mode to reduce the content of the organic acids in the concentrates.

15. The method according to claim 8, wherein the nanofiltration grape must concentrates obtained at the optimal value of concentration factor are further processed by nanofiltration in diafiltration mode to reduce the content of the organic acids in the concentrates.

16. The method according to claim 9, wherein the nanofiltration grape must concentrates obtained at the optimal value of concentration factor are further processed by nanofiltration in diafiltration mode to reduce the content of the organic acids in the concentrates.

17. The method according to claim 2, wherein the nanofiltration grape must concentrates obtained at an optimal value of concentration factor are further processed by electrodialysis to make a fine control of a concentration of organic acids in a final grape must concentrate.

18. The method according to claim 3, wherein the nanofiltration grape must concentrates obtained at an optimal value of concentration factor are further processed by electrodialysis to make a fine control of a concentration of organic acids in a final grape must concentrate.

19. The method according to claim 1, wherein the nanofiltration grape must concentrates obtained at an optimal value of concentration factor are further processed by electrodialysis to make a fine control of a concentration of organic acids in a final grape must concentrate.

20. The method according to claim 6, wherein the nanofiltration grape must concentrates obtained at an optimal value of concentration factor are further processed by electrodialysis to make a fine control of a concentration of organic acids in a final grape must concentrate.

21. The method according to claim 7, wherein the nanofiltration grape must concentrates obtained at an optimal value of concentration factor are further processed by electrodialysis to make a fine control of a concentration of organic acids in a final grape must concentrate.

22. The method according to claim 8, wherein the nanofiltration grape must concentrates obtained at an optimal value of concentration factor are further processed by electrodialysis to make a fine control of a concentration of organic acids in a final grape must concentrate.

23. The method according to claim 9, wherein the nanofiltration grape must concentrates obtained at an optimal value of concentration factor are further processed by electrodialysis to make a fine control of a concentration of organic acids in a final grape must concentrate.

24. The method according to claim 1, where said nanofiltration is conjugated with electrodialysis.

\* \* \* \* \*